(12) United States Patent
Ford et al.

(10) Patent No.: US 6,673,229 B2
(45) Date of Patent: Jan. 6, 2004

(54) ELECTROCHEMICAL APPARATUS AND PROCESS FOR PURIFICATION OF FLUIDS

(75) Inventors: William Ford, Stuttgart (DE); Jurina Wessels, Fellbach (DE); Tobias Vossmeyer, Fellbach (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/898,607

(22) Filed: Jul. 3, 2001

(65) Prior Publication Data

US 2002/0050451 A1 May 2, 2002

(30) Foreign Application Priority Data

Jul. 5, 2000 (EP) .............................. 00114439

(51) Int. Cl.$^7$ ................................. C02F 1/46
(52) U.S. Cl. ............... 205/688; 205/703; 205/746; 205/753; 205/758; 205/759; 205/760; 204/257; 204/263; 204/265; 204/269; 204/270
(58) Field of Search ................. 205/688, 703, 205/746, 753, 758, 759, 760; 204/257, 263, 265, 269, 270

(56) References Cited

U.S. PATENT DOCUMENTS

| 4,455,203 A | | 6/1984 | Stucki |
| 5,419,816 A | * | 5/1995 | Sampson et al. ........... 205/556 |

FOREIGN PATENT DOCUMENTS

| DE | 34 28 582 | 3/1985 |
| EP | 0 876 831 | 11/1998 |
| EP | 0876831 A1 | * 11/1998 |
| EP | 0 968 963 | 1/2000 |

OTHER PUBLICATIONS

Patent Abstracts of Japan, vol. 2000, No. 06, Sep. 22, 2000, JP 2000 079394.
Patent Abstracts of Japan, vol. 1999, No. 04, Apr. 30, 1999, JP 11 010157.
Patent Abstracts of Japan, vol. 1998, No. 13, Nov. 30, 1998, JP 10 223225.
Patent Abstracts of Japan, vol. 012, No. 056, Feb. 19, 1988, JP 62 201968.
Patent Abstracts of Japan, vol. 004, No. 059, May 2, 1980, JP 55 030182.

* cited by examiner

*Primary Examiner*—Arun S. Phasge
(74) *Attorney, Agent, or Firm*—Frommer Lawrence & Haug LLP; William S. Frommer; Samuel H. Megerditchian

(57) ABSTRACT

The invention relates to an apparatus for purifying fluids comprising at least one electrochemical cell having a cathode (3), an anode (5) and an electrolyte (7),
said cathode (3) comprising a metal complex, ML, where M represents a metal and L represents an organic or inorganic ligand, said complex being capable of forming the hydroxyl radical by a reaction wherein the metal in the complex is oxidised and acquires an additional positive charge,
said anode (5) creating positive ions and electrons,
said electrolyte (7) allowing the transfer of a positive charges,
said cathode being arranged such that the fluid to be purified can come into contact with the metal complex on the cathode. The invention also provides a related electrode and a related electrochemical cell as well as a corresponding method for purifying fluids.

30 Claims, 10 Drawing Sheets

ELECTROCHEMICAL APPARATUS AND PROCESS FOR PURIFICATION OF FLUIDS

Figure 1:
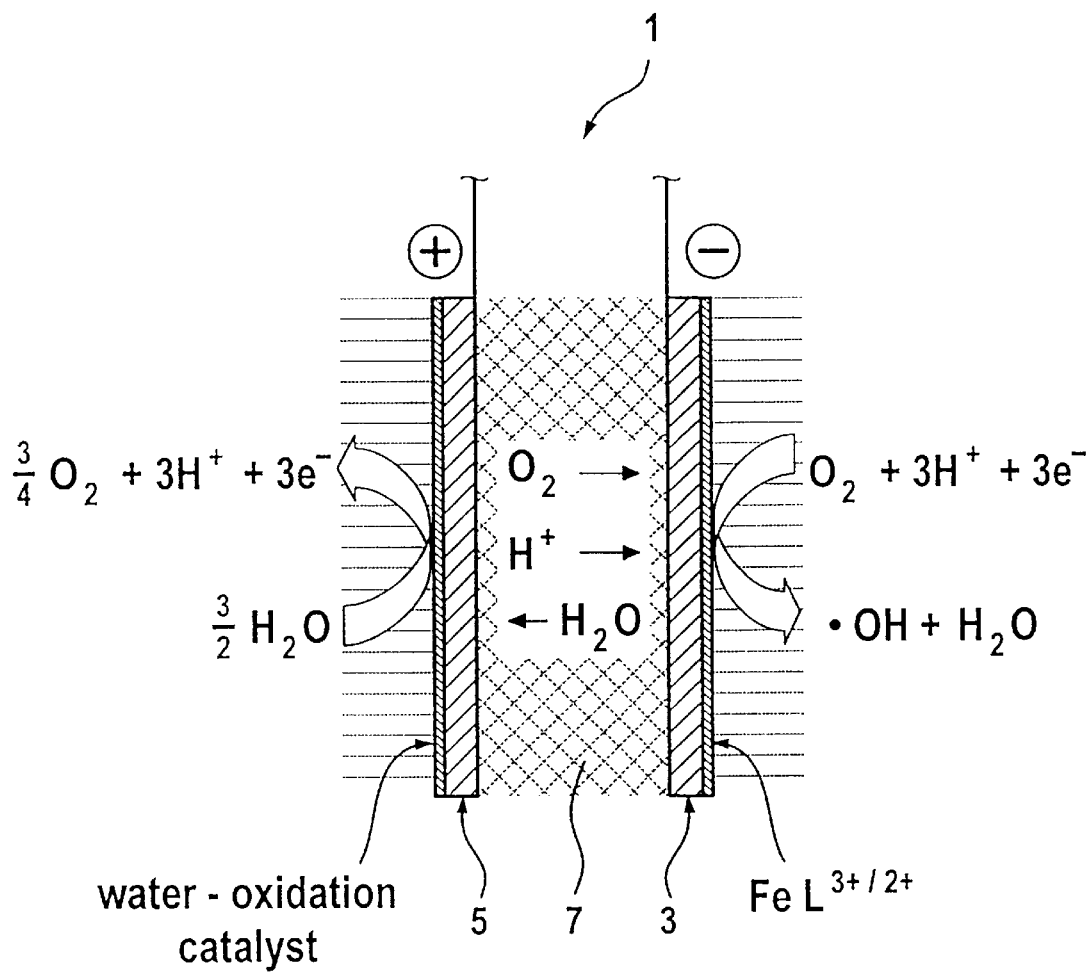

The present invention relates to an electrochemical method and apparatus for purifying fluids, especially waste water or air, e.g. for the purposes of decontamination and/or disinfection. Current methods for treating organic, inorganic and microbiological pollutants in air, water and soil include so-called "advanced oxidation processes". These advanced oxidation processes create a highly reactive oxidizing agent that can readily convert organic waste to carbon dioxide and water, while mineralizing inorganic constituents for easy removal. One of the agents considered in this context is the OH radical, which can be created by the Fenton reaction $$Fe^{2+} + H_2O_2 + H^+ \rightarrow Fe^{3+} + \cdot OH + H_2O. \tag{1}$$

The $Fe^{3+}$-ion is subsequently reduced by hydrogen peroxide via the reaction $$Fe^{3+} + H_2O_2 \rightarrow Fe^{2+} + \cdot O_2H + H^+ \tag{2}$$

Various ways of providing $H_2O_2$ and $Fe^{2+}$ for process (1) were proposed in the past.

J. S. Do and C. P. Chen, J. Electrochem. Soc. 140 (1993), 1632 proposed to create $H_2O_2$ by the reaction $$O_2 + 2H^+ + 2e^- \rightarrow H_2O_2$$

on a graphite, reticulated carbon or carbon-PTFE cathode. $Fe^{2+}$ was added externally.

K. Pratap, A. T. Lemley, J. Agric. Food Chem 42 (1994), 209 proposed to generate $Fe^{2+}$ by a sacrificial iron anode and to add $H_2O_2$ externally.

It was also proposed by E. Brillas et al., Electrochem. Solid-State Lett. 1 (1998), 168 to combine these two approaches, i.e. to produce $H_2O_2$ on a carbon cathode, as indicated above, and to generate $Fe^{2+}$ by a sacrificial iron anode.

EP 0 694 501 A1 discloses an electrochemical cell for purification of contaminated water using OH radicals. In this document it is proposed to enable the Fenton reaction by adding $FeSO_4$ to a liquid electrolyte. Although this electrochemical cell was shown to be effective in destroying pollutants, it requires the continuous addition of $FeSO_4$ when purifying a continuous fluid flow. Furthermore, the classical Fenton reaction, as employed according to this document, has several intrinsic limitations in that it requires $H_2O_2$ to be created, which consumes hydroxyl radicals. Furthermore, the regeneration of $Fe^{2+}$ according to reaction (2) is relatively slow so that $Fe^{3+}$ accumulates in the system, which slows down the reaction rate and leads to precipitation of colloidal solids containing $Fe(OH)_3$, the so-called Fenton-sludge.

U.S. Pat. No. 5,645,700 discloses an electrolytic cell for generation of hydrogen peroxide, wherein a catalyst for a reaction for creating hydrogen peroxide is used which may be a complex of group VIII metals with porphyrines and phthalocyanines as ligands. These ligands prohibit the creation of OH radicals.

John E. Biaglov and Alexander V. Kachur, Radiation Research 148 (1997), 181 and Alexander V. Kachur, Stephen W. Tuttle and John E. Biaglov, Radiation Research 150 (1998), 475 consider the role of Fe-complexes in creating the hydroxyl radical in biological system. They found that a class of Fe-complexes having polyphosphates or acetic derivatives of ethyleneamine as ligands promote the generation of the OH radical. These complexes were considered for modelling biological processes. A relation of this effect to the purification of fluids, for example waste water, was not considered.

All previously mentioned Fenton-type processes require the addition of an iron salt or an Fe complex to a liquid, or the provision of a sacrificial iron anode.

It is the object of the present invention to provide a basically self-sustained apparatus for purifying fluids employing an electrochemical cell and a related method for purifying fluids.

This object is accomplished according to the invention by an apparatus for purifying fluids comprising at least one electrochemical cell having a cathode, an anode and an electrolyte between cathode and anode, said cell comprising a metal complex, ML, immobilized at or in a solid at the cathode side of the electrolyte, as opposed to the anode side, wherein M represents a metal, L represents an organic or inorganic ligand, said complex being capable of forming the hydroxyl radical by a reaction wherein the metal in the complex is oxidised and acquires an additional positive charge, said anode creating positive ions and electrons, said electrolyte allowing the transfer of positive charges, said solid being arranged such that the fluid to be purified can come into contact with the metal complex.

Said oxidation of said metal may especially involve oxygen and/or $H^+$ ions

According to a preferred embodiment, the metal complex is an iron complex, FeL, wherein the FeL complex may allow for the iron having two different oxidation states $Fe^{2+}L$ and $Fe^{3+}L$.

The solid may especially be the cathode or the electrolyte. According to the invention, the metal complex may be deposited, attached or incorporated into the cathode or into a solid electrolyte at the cathode side thereof. In the latter case, the cathode may be bonded, deposited or otherwise attached to said cathode side of the electrolyte in a way allowing the reduction of the metal in the complex by providing an electron, e.g. from $Fe^{3+}$ to $Fe^{2+}$.

The anode and cathode are connected or connectable to a power source which may or may not be part of the apparatus.

Usually, the apparatus according to the invention will comprise means for guiding the fluid to be purified to the cathode and/or means for guiding purified fluid away from the cathode.

The invention may also provide that said Fe complex FeL is capable of undergoing the net reaction $$3Fe^{2+}L + O_2 + 3H^+ \rightarrow 3Fe^{3+}L + \cdot OH + H_2O. \tag{3}$$

Fe complexes enabling other reactions involving agents that readily produce oxygen, e.g. $H_2O_2, \cdot O_2H$ etc., may also be considered in order to produce the hydroxyl radical. Especially, the Fe complex may be capable of undergoing the reaction.

$$Fe^{2+}L + H_2O_2 + H^+ \rightarrow FeL^{3+} + \cdot OH + H_2O,$$

wherein $H_2O_2$ may be externally provided from an $H_2O_2$ source or produced in situ.

Preferably said anode enables a reaction creating $H^+$ ions and electrons and said electrolyte allows the migration of $H^+$ ions, although other ways of providing $H^+$ ions may be contemplated.

The invention may also provide that said anode comprises a catalyst for promoting the reaction.

$$H_2O \rightarrow \tfrac{1}{2}O_2 + 2H^+ + 2e^-. \tag{4}$$

Said catalyst may be a metal oxide or a mixture of metal oxides containing at least one transition metal and often including one of the precious metals, such as Ru, Rh, Pd, Os, Ir, Pt.

Said catalyst may especially be ruthenium dioxide, iridium dioxide and mixed oxides of ruthenium and manganese, ruthenium and titanium, or nickel and cobalt.

Chelating agents suitable for forming a Fe complex are generally suitable ligands L.

The invention may provide that the ligand L is selected from the group comprising polyphosphates, pyrophosphates, bisphosphonates, polyaminocarboxylates, citrates, ethylene amines and derivatives thereof and further comprising analogues of said substances and derivatives which allow covalent attachment to the cathode.

The ethyleneamines mentioned above especially comprise ethylenediamine and ethylenediaminetetraacetic acid (EDTA).

The invention may also provide that said ligand is selected from the group comprising acetic derivatives of ethylene amine, polyphosphates or bisphosphonates and analogues thereof.

The ligand may be coupled directly to the surface of the electrode via a functional moiety selected from the group comprising an amino group, a hydroxyl group and a carbonyl group. In one embodiment the amino group may form part of 3-aminopropylsilanol or of derivatives thereof, wherein the attachment to the electrode surface occurs through the silanol moiety.

The invention may especially provide that the ligands are of the general form

R—(NX$_2$)$_p$, wherein X is selected from the group comprising

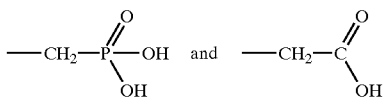

and wherein $1 \leq p \leq 2$;
and wherein R is an organic moiety.

R is preferably selected from the group comprising
alkylsilanol, the preferred alkyl being $C_1$–$C_{10}$ alkyl, especially propyl, substituted and unsubstituted triazines, triazine being preferably substituted in the 2-, 4- or 6-position with n-amino-(CH$_2$)$_n$ silanol, n being an integer, preferably $1 \leq n \leq 10$, more preferably n=3, and

[(CH$_2$)$_m$(NX)]$_q$(CH$_2$)$_n$(NX)(CH$_2$)$_o$SiO$_3$, o being an integer, preferably 3, n being an integer, preferably 2, q being an integer, preferably selected from the range of $0 \leq q \leq 5$, m being an integer, preferably 2.

Other ligands that may be contemplated are chelating resins containing iminodiacetic or aminoalkylphosphonic acid groups, especially those disclosed in U.S. Pat. No. 5,804,606 to Surowiec et al., to which reference is made for further details.

If the substrate to which the ligand is attached is a carbon based substrate, covalent attachment of the ligand may occur through an amino group or by an oxygen-containing functional group such as a carbonyl group or a hydroxyl group, especially a hydroxyl group, wherein a hydrogen atom is substituted by said ligand. If the substrate is a metal oxide, covalent attachment by silylation is preferred.

According to the invention, the ligand may be attached to the cathode in a covalent manner.

The invention may provide that the ligand exhibits a covalent bond to the cathode obtainable by silylation.

The ligand may especially be attached to the cathode by a silyl group or silyl groups.

The invention may also provide that said anode and/or cathode is a carbon or metal oxide electrode.

The invention may also provide that said anode and/or cathode is porous.

The invention may also provide that it comprises means for conducting the fluid to be purified to a side of the cathode where it may come into contact with the Fe-complex, said anode being isolated from the fluid to be purified.

The invention may also provide that the electrolyte is a solid electrolyte membrane with the cathode and anode attached, deposited or otherwise connected thereto. According to a specific embodiment, the metal complex ML and/or the catalyst for promoting reaction (4) are incorporated in the electrolyte at the anode and cathode side thereof respectively.

The invention may also provide that the electrolyte is sandwiched between a cathode and an anode, said cathode having a side contacting the fluid to be purified and an electrolyte contacting side, and that the electrolyte prohibits the migration of the fluid to be purified and/or of pollutants therein to the anode.

Especially in this embodiment porous electrodes may be provided.

The invention may also provide that said electrolyte allows the migration of $O_2$ and $H_2O$.

The invention may also provide that the apparatus comprises a plurality of electrochemical cells and means for bringing the fluid to be purified in contact with the cathode of each cell.

The invention may also provide that said plurality of cells is arranged in a series, parallel and/or cyclic configuration with respect to the flow of the fluid to be purified.

The invention may provide that at least part of the outer walls of a cell form an electrode of said electrochemical cell and at least part of the cells share a common wall with another cell, said common wall forming an electrode for at least two cells.

The invention may also provide that the apparatus comprises conduit means for conducting the fluid to be purified, at least part of the walls of said conduit means and preferably the entire walls being formed by the cathode of one or more electrochemical cells.

The invention may especially provide that the electrochemical cell comprises a closed channel for conducting the fluid to be purified therethrough, at least part of the walls of said channel being formed by the cathode of said electrochemical cell.

The invention may also provide an electrochemical cell for use in an apparatus or method for purifying fluids, especially waste water, comprising a cathode, an anode and an electrolyte, said cell comprising a metal complex, especially an Fe-complex, FeL, immobilized at or in a solid at the cathode side of the electrolyte, as opposed to the anode side, said complex comprising an organic or inorganic ligand L, said complex being capable of forming the hydroxyl radical by a reaction wherein the metal in the complex is oxidised and acquires an additional positive charge, said anode enabling a reaction creating positive ions and electrons, said electrolyte allowing the transfer of positive charges. Said positive ion may especially be a H$^+$ ion. In order to complete the reaction cycle, said metal, having been oxidised or being in an oxidised state, is electrochemically reduced.

The invention may also provide an electrode for use in an electrochemical apparatus for purifying fluids, wherein said electrode comprises a metal complex, especially an Fe-complex, FeL, said complex comprising an organic or inorganic ligand L, said complex being capable of forming the hydroxyl radical by a reaction wherein the metal in the complex is oxidised and acquires an additional positive charge.

More specific embodiments of the electrochemical cell and the electrode according to the invention have already been outlined above.

The invention may also provide a method of purifying fluids, especially waste water, comprising the steps of providing a cathode and an anode, said anode and cathode being separated by an electrolyte allowing the transfer of positive charges, and providing a metal complex, especially an Fe-complex, FeL, immobilized at or in a solid at the cathode side of the electrolyte, said complex comprising an organic or inorganic ligand L, said complex being capable of forming the hydroxyl radical by a reaction wherein the metal in the complex is oxidised and acquires an additional positive charge, said anode creating positive ions and electrons, connecting said cathode and anode to an electric power source, conducting fluid to be purified to the metal complex.

The invention may also provide that said Fe complex FeL is capable of undergoing the reaction (3)

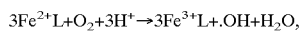
$$3Fe^{2+}L + O_2 + 3H^+ \rightarrow 3Fe^{3+}L + \cdot OH + H_2O,$$

said anode enabling a reaction creating $H^+$ ions and electrons, said anode and cathode being separated by an electrolyte, said electrolyte allowing the migration of $H^+$-ions. The anode may also comprise a catalyst for promoting reaction (4).

The invention may also provide that $O_2$ is conducted either separately or together with said fluid to be purified to the cathode or the cathode side of the electrolyte to come into contact with the Fe-complex.

The invention may also provide that $O_2$ is added to the fluid to be purified.

The invention may also provide that said electrolyte allows the transfer of $O_2$ and that $O_2$ is fed to said electrolyte.

The invention may also provide that $H_2O$ is supplied to the anode or to the anode side of the electrolyte to come into contact with the reaction site, especially the catalyst at the anode.

The invention may also provide that said electrolyte allows the transfer of $H_2O$ and $H_2O$ is fed to said electrolyte.

Whereas specific reference was made previously to a metal complex and especially an Fe complex, the invention more generally provides for a catalyst for promoting an electrochemical reaction creating the hydroxyl radical, said catalyst being immobilized at or in a solid at the cathode side of the electrolyte.

According to the preferred embodiments of the invention, the hydroxyl radical is electrochemically generated by a method comprising:
  providing a catalytic $O_2$ generating anode, especially a water oxidising anode.
  providing a catalytic cathode generating the hydroxyl radical,
  positioning a polymeric electrolyte ion transporting membrane between the anode and the cathode, the anode being bonded to one surface of the membrane and the cathode being bonded to the other surface of the membrane,
  providing a direct potential between the anode and cathode and supplying $O_2$ to the cathode.

The apparatus according to the invention has several distinct advantages over the prior art. No external source of $H_2O_2$ or elemental Fe is required. The only reagent consumed in the overall process is $O_2$, which is supplied by air. Water can be purified without adjusting its pH or ionic strength. In contrast the prior art requires acidic conditions and high salt concentrations (for adequate ionic conductivity between anode and cathode). Gases (such as air) can also be purified.

Figure 2:
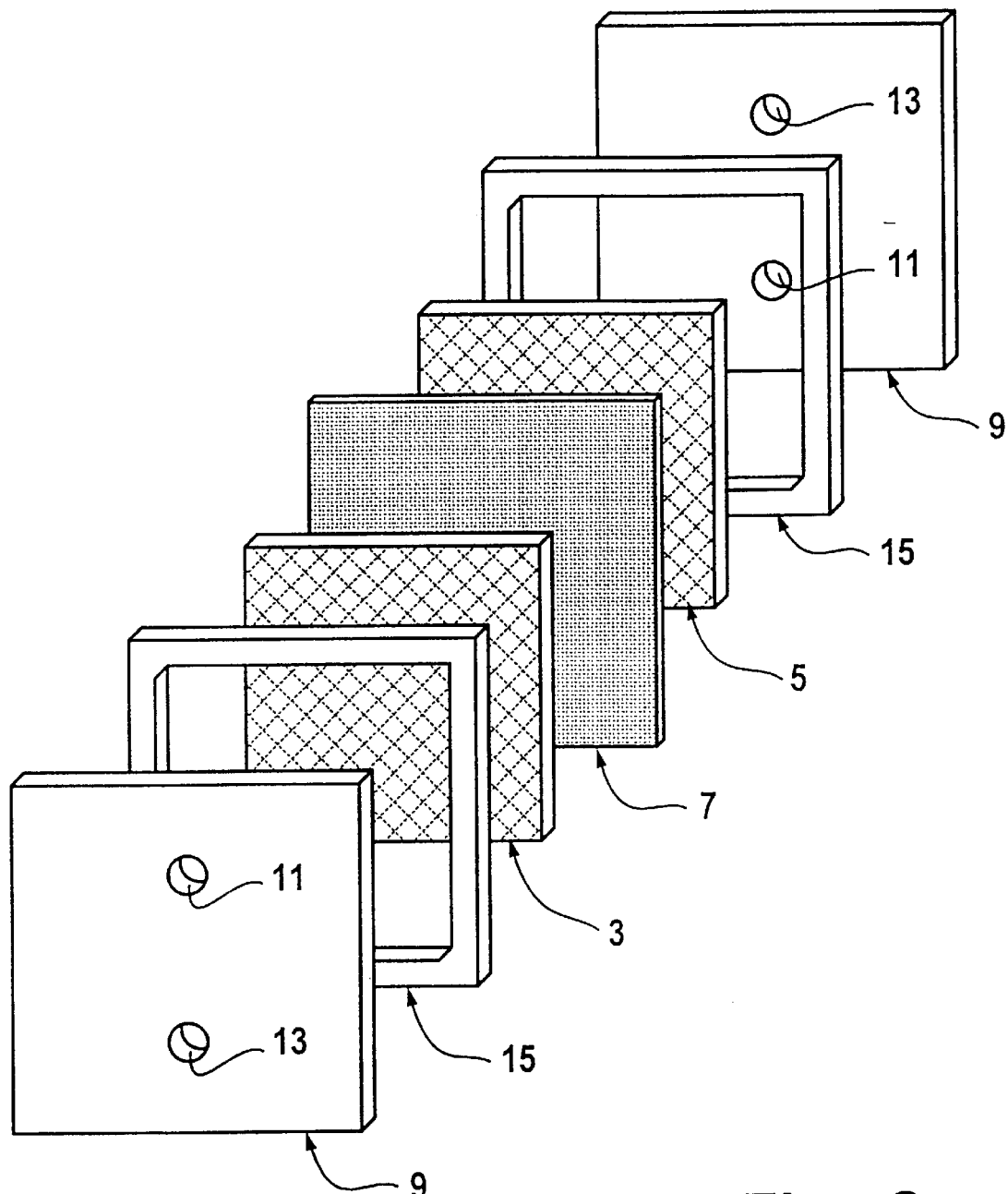
Figure 3:
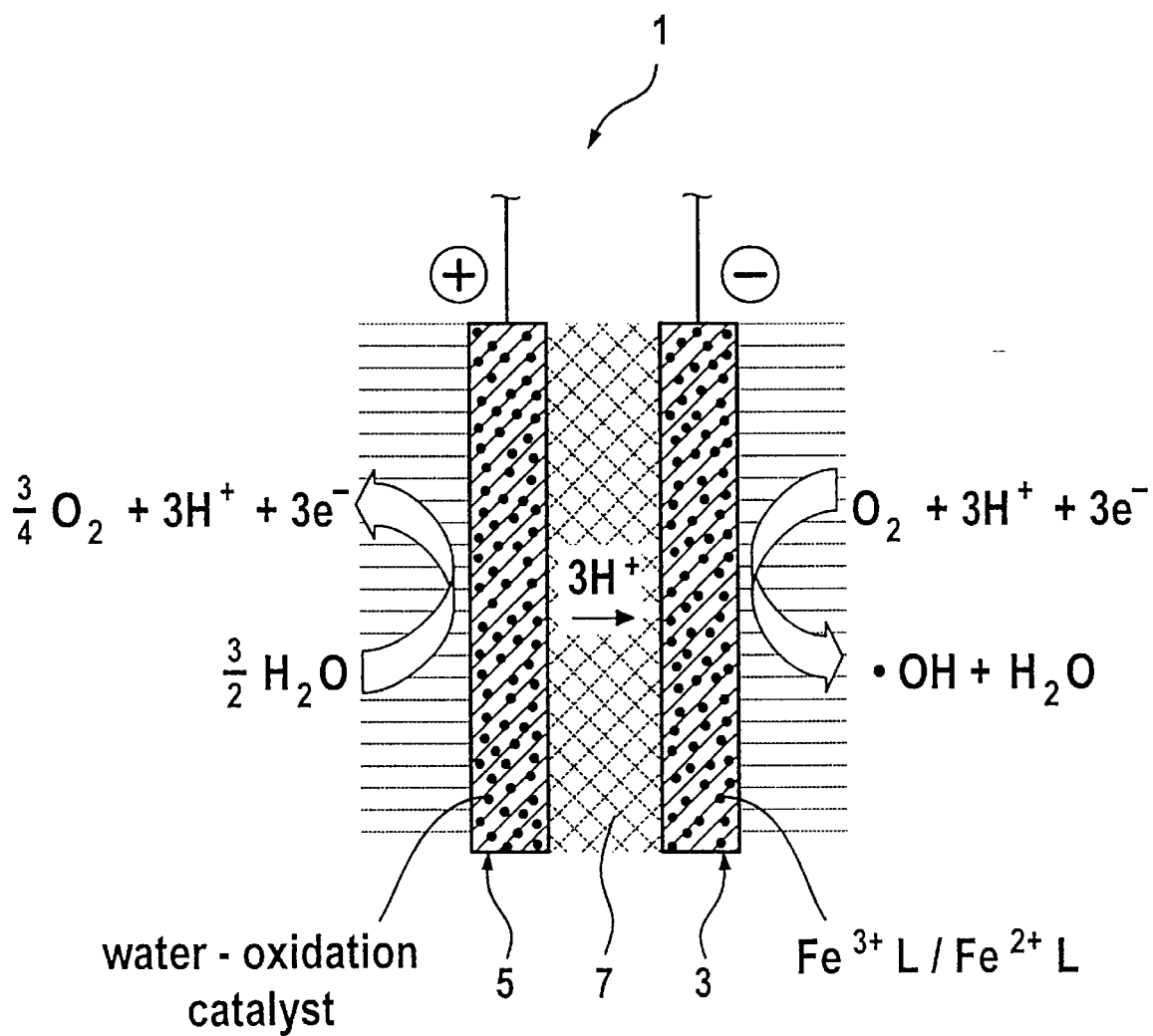

Further features, characteristics and advantages of the invention will be apparent from the following description of an exemplary embodiment of an apparatus according to the present invention with reference to the attached drawings. In the drawings FIG. 1 shows a schematic sketch of the principal structure of an exemplary electrochemical cell to be employed in an apparatus according to the present invention, FIG. 2 shows an exploded view of the components of a single electrochemical cell that may be employed in the apparatus according to the present invention, FIG. 3 shows a schematic functional diagram of the cell according to FIG. 2

Figure 4:
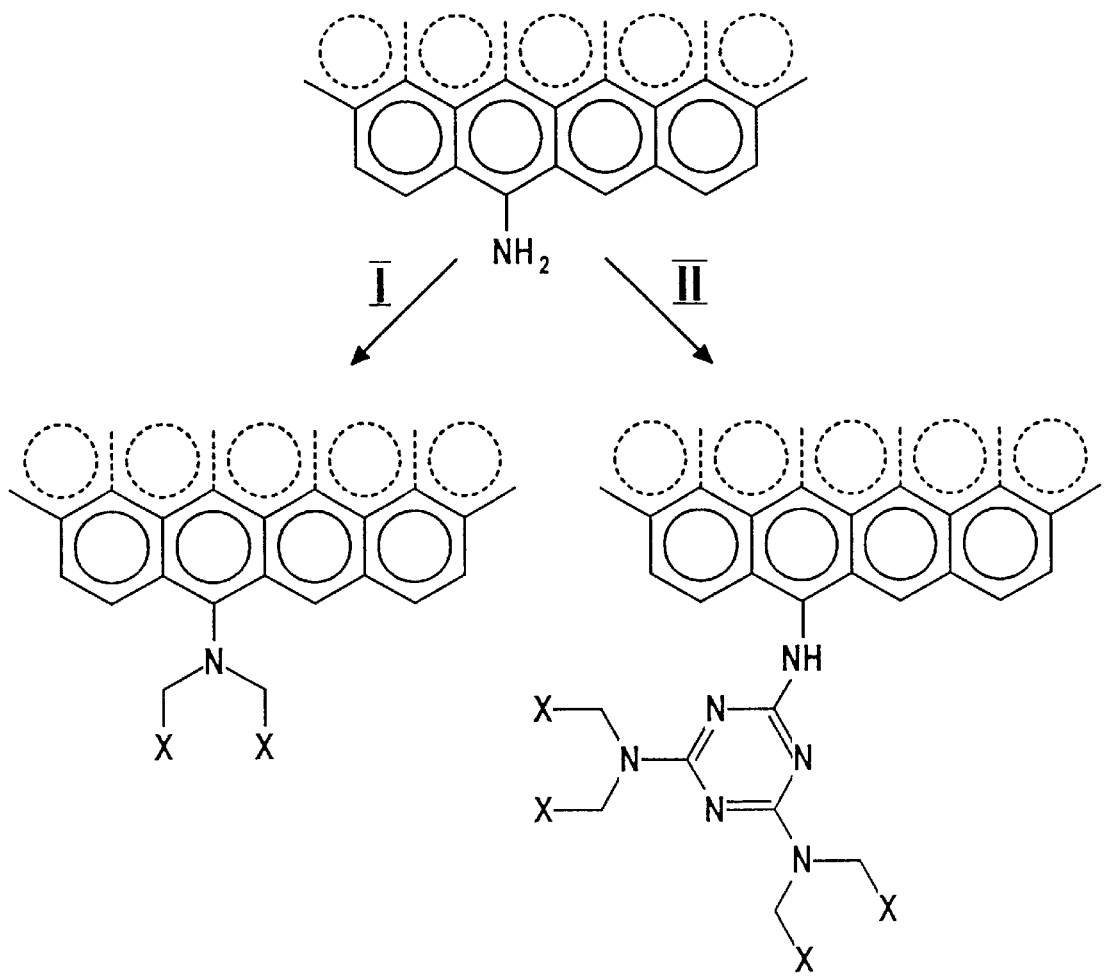
Figure 4:
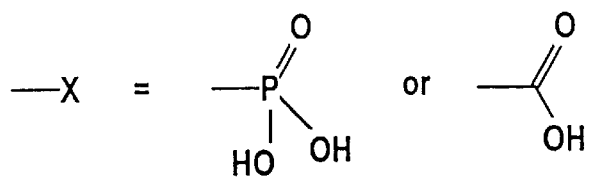
Figure 5:
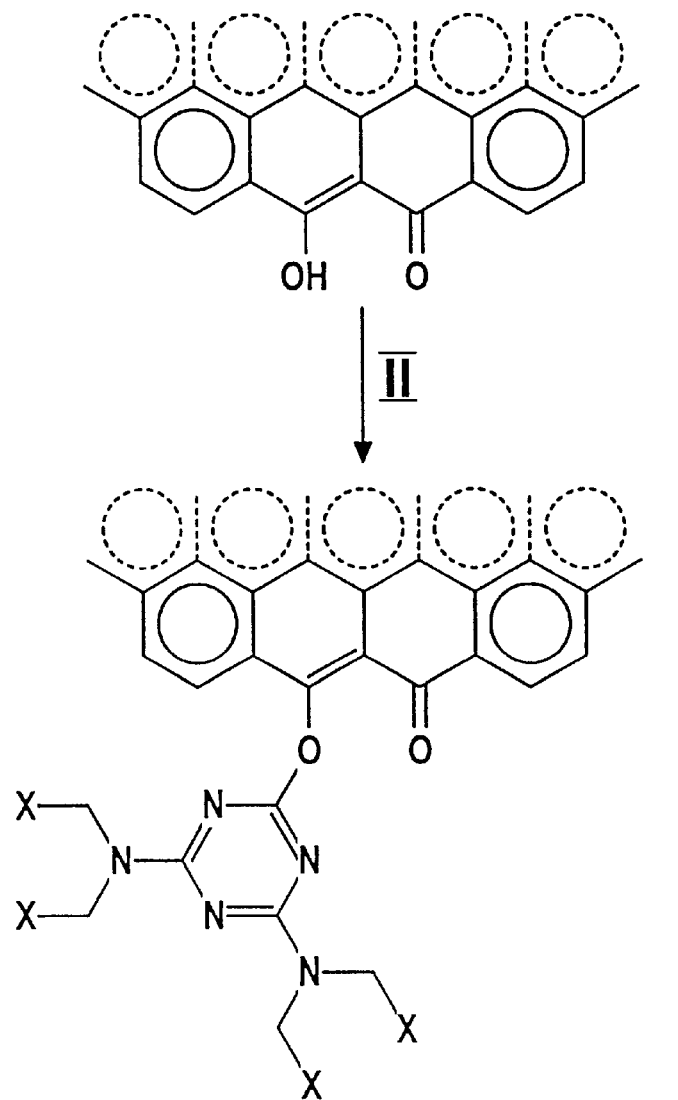
Figure 5:
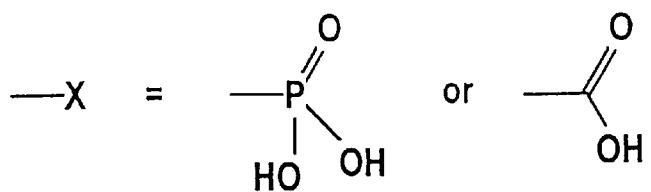
Figure 6:
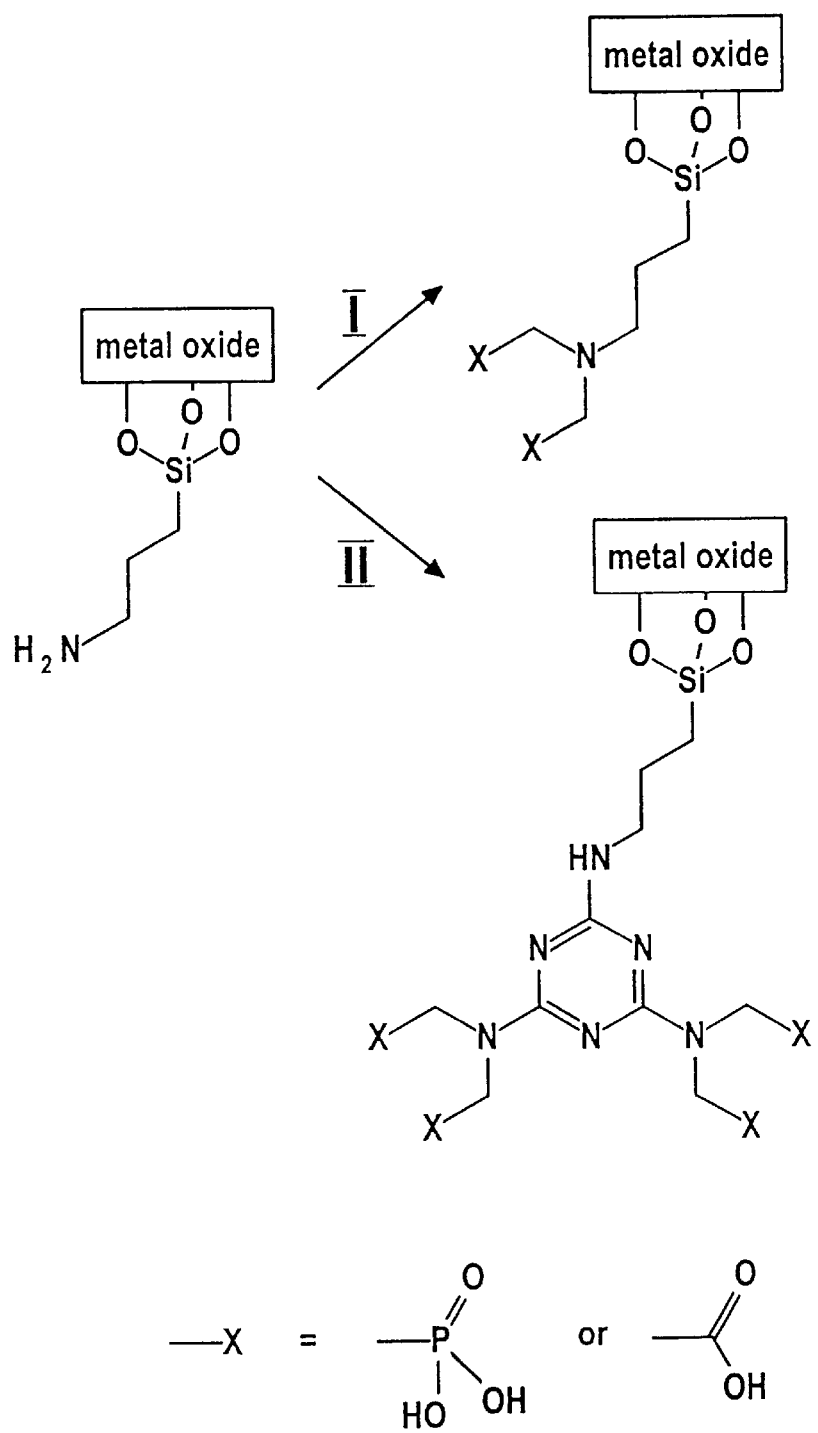
Figure 7:
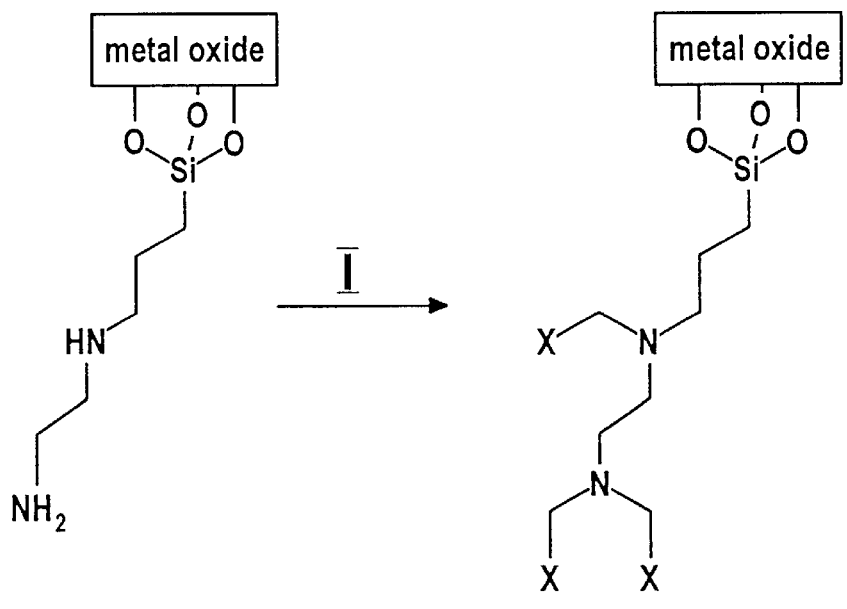
Figure 7:
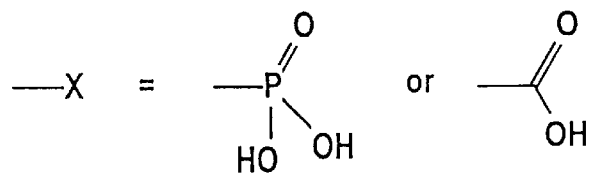
Figure 8:
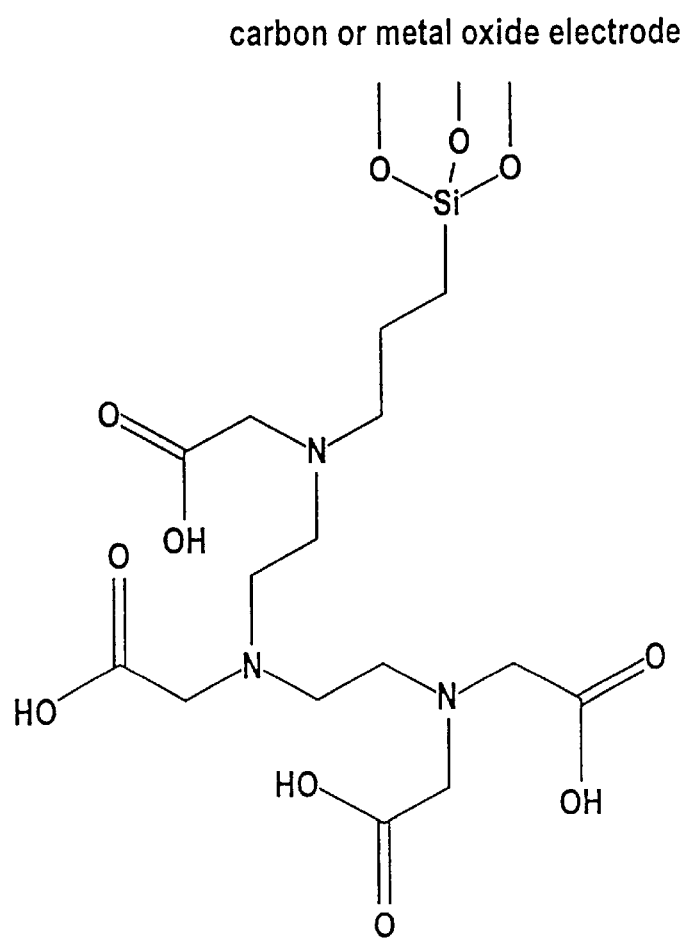
Figure 9:
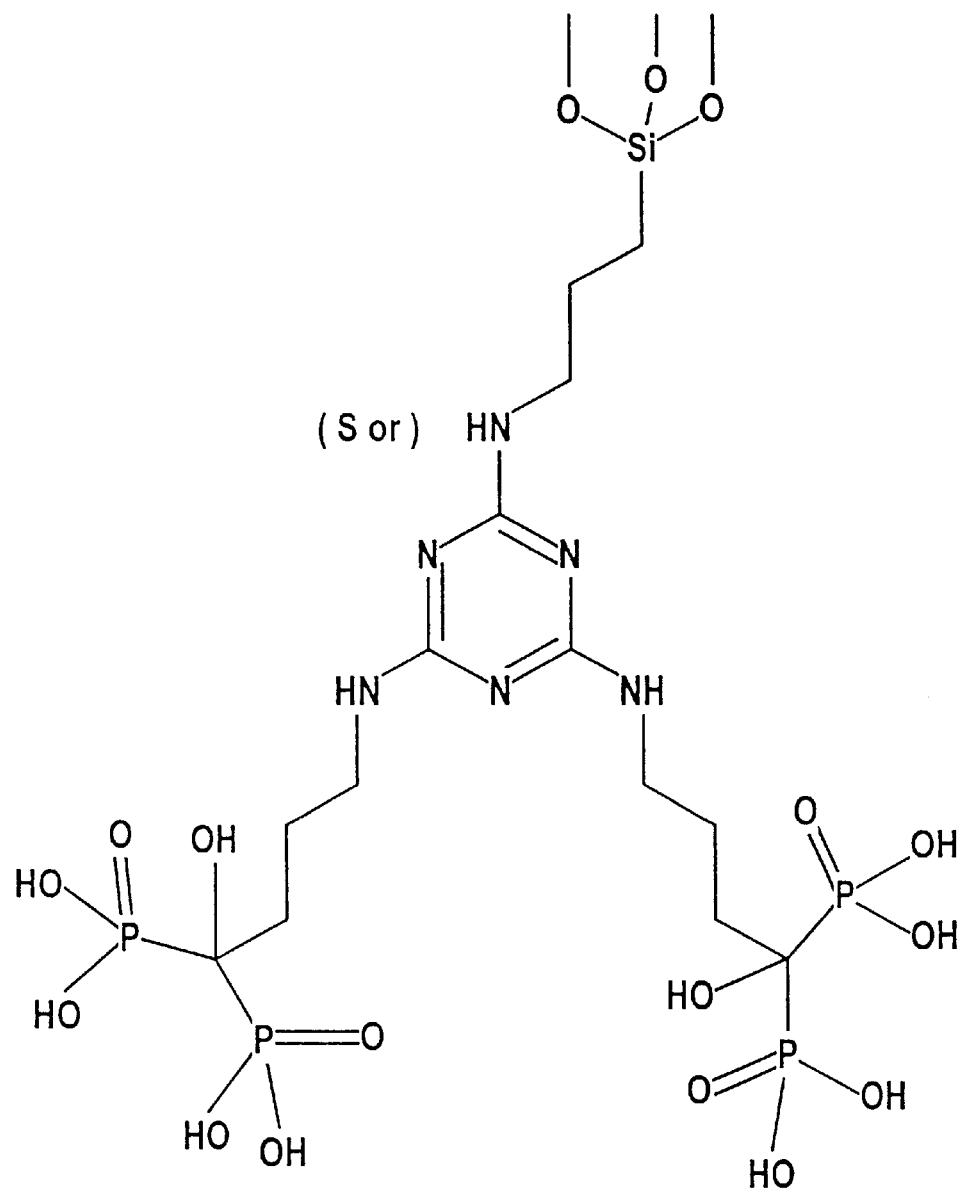
Figure 10:
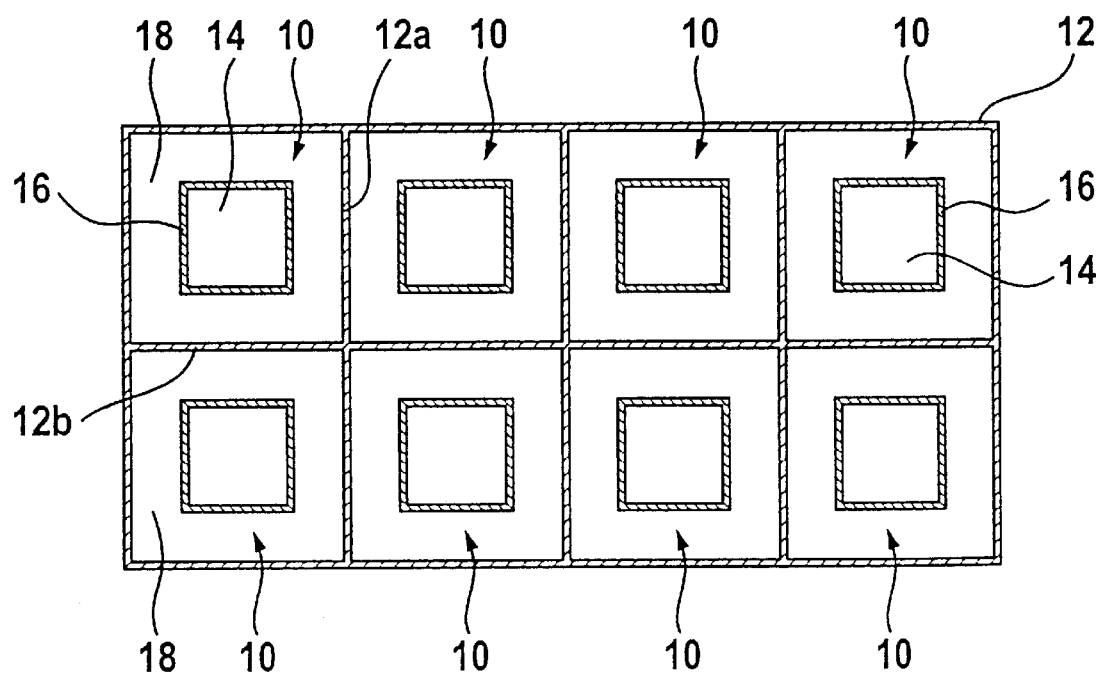

FIG. 4 shows two general routes to the synthesis of ligands of Fe-ion catalysts attached to an aminated carbon support, FIG. 5 shows a general route to the synthesis of ligands of Fe-ion catalysts attached to an oxygenated carbon support, FIG. 6 shows two general routes to the synthesis of ligands of Fe-ion catalysts attached to a metal oxide support via 3-aminopropylsilanol, FIG. 7 shows a general route to the synthesis of ligands of Fe-ion catalysts attached to a metal oxide support via N-(2-aminoethyl)-3-aminopropylsilanol, FIG. 8 shows a polyaminocarboxylate-based ligand for the Fe-complex, FIG. 9 shows a bisphosphonate ligand for the Fe-complex, containing two bisphosphonate groups as binding sites, FIG. 10 is a schematic sketch of a possible arrangement of a plurality of electrochemical cells in an apparatus according to the present invention.

Referring to FIG. 1, the electrochemical cell of an apparatus according to an embodiment of the present invention, generally referred to as 1, comprises a cathode 3, an anode 5 and a polymeric electrolyte 7 sandwiched between the cathode 3 and the anode 5. The cathode 3 and the anode 5 are connected or connectable to a source of electrical power (not shown).

The electrodes 3 and 5 are porous and can be made of electrically conductive materials that are amenable to surface modification for attachment of surface modifying substances like catalysts, preferably by covalent attachment, e.g. by silylation. These requirements are met by a variety of materials, especially carbon-based materials, e.g. glassy carbon, and metal oxides. The electrodes 3 and 5 can also consist of mixtures or composites of electrically conductive materials and electrically non-conductive materials, at least one of which is amenable to surface modification for attachment of said surface modifying substances.

The anode 5 comprises a catalyst for catalysing the oxidation of water according to the reaction (4)

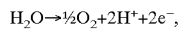
$$H_2O \rightarrow \tfrac{1}{2}O_2 + 2H^+ + 2e^-,$$

such as $RuO_2$, $IrO_2$, Pt or $Co_3O_4$, e.g. as a layer attached to a substrate. Catalysts for promoting reaction (4) are well known in the art. Especially, metal and metal oxides which are known to catalyse the oxidation of water can be deposited onto the electrode surface by a chemical or electrochemical process. Other catalysts include mixed oxides of ruthenium and manganese, ruthenium and titanium, or nickel and cobalt.

The surface of cathode 3 has an Fe-complex of the general form FeL attached thereto, wherein L is a ligand and the iron in said complex is able to have a double positive or a triple positive charge, i.e. $Fe^{2+}L$ or $Fe^{3+}L$. These positively charged oxidation states of the iron atom are generally referred to as ferrous and ferric, respectively. According to one embodiment said Fe-complex may be applied as a layer and may be especially provided at the surface of cathode 3 facing away from the electrolyte 7, where the fluid to be purified comes into contact with the cathode, although the invention is not limited thereto. The ligand L is chosen such that it promotes the reaction (3)

$$3Fe^{2+}L+O_2+3H^+ \rightarrow 3Fe^{3+}L+.OH+H_2O.$$

Suitable ligands are polyaminocarboxylates, polyphosphates and bisphosphonates, or, preferably, analogues thereof that can be attached to the electrode surfaces in a covalent manner, e.g. by silylation.

According to an important aspect of the invention, the FeL-complex is immobilized onto the cathode, which not only facilitates its regeneration from $Fe^{3+}L$ to $Fe^{2+}L$, but also prevents it from dissolving into the fluid to be purified. Thus, the apparatus according to the present invention can be used for continuous purification as opposed to a batch process.

Although presently covalent attachment is preferred, it is to be understood that other ways of depositing, attaching or incorporating the Fe complex on or into the cathode 3 or, more generally, to a solid, e.g. on or into the cathode side of a solid electrolyte, may be contemplated for immobilizing the FeL complex. It is also to be understood that the ligand L in the Fe complex of the general form FeL represents a complicated and possibly dynamic coordination sphere whose nature may be organic or inorganic or both. Ligands present in the fluid phase, the surface of the cathode or within the membrane may contribute to coordination sphere respresented by L and these may change during the catalytic cycle between the $Fe^{3+}L$ and $Fe^{2+}L$ forms.

The electrolyte 7 between the cathode 3 and the anode 5 is preferably a solid electrolyte that is able to allow the migration of $H^+$-ions. The electrolyte preferably also allows the migration of $O_2$ and $H_2O$, but it may be impermeable to other substances, especially possible pollutants, thereby preventing the poisoning of the catalyst at the anode side. Polymeric electrolytes are preferred, as they make it possible to treat water, having a low ionic conductivity, as well as a gas phase. For example, perfluorinated ion-exchange materials containing sulfonic acid groups (Nafion resins) can be used.

FIGS. 2 and 3 show a specific embodiment of a single electrochemical cell embodying the present invention. In this embodiment the electrolyte is a polymeric electrolyte in the form of a membrane which is bonded together with the cathode 3 and the anode 5 to form a multilayer composite structure frequently referred to as a membrane electrode assembly (MEA). Conductive end plates 9 with an inlet port 11 and an outlet port 13 are arranged opposite the electrodes 3 and 4 and spaced therefrom by inert spacers 15. The FeL complex and a water oxidation catalyst are incorporated into the cathode and anode, respectively, as shown in FIG. 3.

The polymeric ion transporting membrane should be capable of transferring ions and be compatible with the electrochemical cell environment. Commercially available membranes that are suitable for this purpose include the perfluorinated iron-exchange membranes produced by E.I. Du Pont de Nemours and Co. under the tradename "Nafion" and by Asahi Glass Corporation under the tradename "Flemion". These membranes exhibit excellent chemical stability under both oxidative and reductive environments owing to the Teflon-like molecular back-bone. In a modified embodiment, the FeL-complex and/or the catalyst for promoting the reaction (4) are incorporated into the ion transporting membrane 7. Methods of incorporating catalysts into polymeric ion transporting membranes are well known in the art. The anode and cathode layers of the membrane electrode assembly are pressed into, embedded into, mounted directly upon or otherwise bonded to the surface of the membrane, as is common in the art.

During operation the Fe-complex at the cathode or in the polymeric membrane 7 is brought into contact with the fluid to be purified, e.g. waste water. At the cathode side of the cell, OH radicals are created by reaction (3), $$3Fe^{2+}L+O_2+3H^+ \rightarrow 3Fe^{3+}L+.OH+H_2O.$$

$Fe^{3+}L$ produced thereby is reduced to $Fe^{2+}L$ by an electron provided by the cathode $$Fe^{3+}L+e^- \rightarrow Fe^{2+}L \qquad (5)$$

so that the net reaction at the cathode side is $$O_2+3H^++3e^- \rightarrow .OH+H_2O. \qquad (6)$$

It will appreciated that no iron is consumed in this process so that the Fe complex acts as a catalyst.

The anode is wetted with water and produces oxygen and $H^+$-Ions by reaction (4), $$H_2O \rightarrow \frac{1}{2}O_2+2H^++2e^-.$$

In the preferred version of the embodiment having the FeL complex and the catalyst attached to cathode and anode, respectively, the catalytic layers on cathode 3 and anode 5, the electrodes and the electrolyte are permeable to $O_2$ and $H_2O$ and its ionic forms (i.e. hydrated $H^+$ and/or $OH^-$). $O_2$ and $H^+$ created by reaction (4) migrate through porous anode 5 and the electrolyte 7 to the porous cathode 3 and through said cathode 3 to the side of the electrode having the FeL-complex attached thereto in order to participate in reaction (6). Likewise, $H_2O$ migrates through the porous cathode 3 and the electrolyte to porous anode 5 and through anode 5 to the catalyst attached thereto, where it contributes to reaction (3).

In the embodiment according to FIG. 2 having the complex and the catalyst attached to or embodied in the electrolyte, the entire membrane electrode assembly is permeable to $O_2$ and to $H_2O$ and its ionic forms. Oxygen and $H^+$ created at anode 5 by reaction (4) migrate through the membrane 7 to the cathode 3 where they participate in reaction (6). Likewise, $H_2O$ created at the cathode 3 migrates through the membrane 7 to the anode 3, where it contributes to reaction (3).

Although part of the $O_2$ involved in the cathode reaction (6) can be provided by said migration process through the electrolyte, the entire process requires an external supply of oxygen. Additional oxygen is necessary because the destruction of pollutants with the OH radical is essentially a combustion reaction. Oxygen may be supplied at the cathode side, e.g. by enriching waste water with oxygen in a well-known manner.

$H_2O$ involved in the anode reaction (4) can be provided by the above-mentioned migration process through the membrane. Water will frequently be present at the cathode side, if the fluid to be purified is a liquid. Likewise, the reaction of the OH radical with the pollutant frequently results in an excess of water. However, there can be evaporation losses and some of the water may be carried away by the fluid, especially if the fluid to be purified is a gas. Thus, a water supply may also be needed. Water may be supplied to the apparatus either in liquid a vapour form, if required for proper functioning. Water may e.g. be conducted to the catalyst side of the anode 5 by suitable conduit means, as indicated in FIG. 1. If the electrolyte is impermeable for $O_2$ and $H_2O$, a separate supply of water and oxygen at the cathode and the anode side is necessary.

Alternatively, it is also possible in case of an electrolyte permeable to $O_2$ and $H_2O$ to deliver oxygen and water to the electrolyte, from where oxygen and water will migrate to the cathode and anode, respectively. This latter embodiment does not require a separate water conduit leading to the anode and accordingly allows the realization of a compact apparatus.

As mentioned before, polyaminocarboxylates and polyphosphates and their analogues are suitable ligands for practising the invention.

Procedures for immobilizing analogous ligans on the cathode as precursors to the Fe-ion catalyst are presented schematically in FIGS. 4 through 7. These procedures will be described hereinafter, although the invention is by no means limited to their use.

The examples drawn in FIGS. 4 through 7 can be classified according to a) the nature of the support (carbon or metal oxide), b) whether 1,3,5-triazine is present as a linking agent, and c) the nature of the ligand.

Procedures for modifying carbon-based supports are shown in FIGS. 4 and 5. These carbon-based materials may be in the form of powders, fibers, etc., but the preferred from is cloth. The starting material in FIG. 4 is aminated carbon. Amino groups are generated on carbon by treating it with a combination of sulfuric and nitric acids to introduce nitro groups, then reducing the nitro groups with a combination of powdered iron and hydrochloric acid as described in S. Tanada et al., J. Colloid Interface Sci. 214 (1999), 106. The amino groups can either be converted directly into the desired ligands (route I) or first be treated to introduce the 1,3,5-triazine group (route II).

Route I is exemplified for two ligands comprising methylenephosphonic acid groups and acetic acid groups, respectively. For generating the first mentioned ligand, the aminated carbon is treated with phosphorous acid and formaldehyde in aqueous hydrochloric acid solution to convert the two hydrogen atoms on the amino groups into methylenephosphonic acid groups. The net reaction is

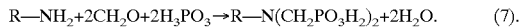

$$R\text{—}NH_2+2CH_2O+2H_3PO_3 \rightarrow R\text{—}N(CH_2PO_3H_2)_2+2H_2O. \quad (7)$$

Treatment of the aminated carbon with an aqueous solution of bromoacetic acid and sodium carbonate followed by acidification converts the hydrogen atoms on the amino groups into acetic acid groups. The net reaction is

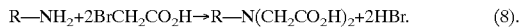

$$R\text{—}NH_2+2BrCH_2CO_2H \rightarrow R\text{—}N(CH_2CO_2H)_2+2HBr. \quad (8)$$

The corresponding processes according to route II are as follows: The aminated carbon is treated with a solution of 2,4,6-trichloro-1,3,5-triazine (also known as cyanuric chloride) in acetone to attach the 2,4-dichloro-1,3,5-triazine moiety. This product is treated with an aqueous solution of iminodi(methylenephosphonic acid) and sodium carbonate followed by acidification to replace each remaining chlorine atom on the triazine ring with the iminodi(methyenephosphonic acid) group. The net reaction is

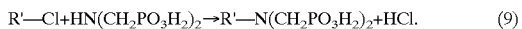

$$R'\text{—}Cl+HN(CH_2PO_3H_2)_2 \rightarrow R'\text{—}N(CH_2PO_3H_2)_2+HCl. \quad (9)$$

Treatment with an aqueous solution of iminodi(acetic acid) and sodium carbonate followed by acidification replaces each chlorine atom with the iminodi(acetic acid) group. The net reaction is

$$R'\text{—}Cl+HN(CH_2CO_2H)_2 \rightarrow R'\text{—}N(CH_2CO_2H)_2+HCl. \quad (10)$$

The starting material for the process illustrated in FIG. 5 is graphite or glassy or amorphous carbon (e.g., charcoal or carbon fiber, etc.). These substances naturally have various oxygen functional groups at their surfaces, but the densities of these groups may be increased by any of a variety of oxidation methods known in the prior art. These O-containing functional groups include hydroxyl (C—OH) and carbonyl (C=O), as indicated in the figure. The hydroxyl group, like the amino group in aminated carbon, serves as a point of attachment for the 2,4-dichloro-1,3,5-triazine moiety. Therefore, the procedure used to attach iminodi(methylenephosphonic acid) or iminodi(acetic acid) ligands to the oxygenated carbon surface is the same as route II described previously.

Procedures for modifying metal oxide supports are shown in FIGS. 6 and 7. Various kinds of metal oxides are suitable, but preferred are those used for electrodes in the prior art, notably tin dioxide and titanium dioxide, which may be doped to improve electrical conductivity. The metal oxide-based material may be in the form of e.g. free-flowing powder, but the preferred form is highly dispersed particles on porous carbon cloth. Techniques for depositing metal oxide particles on carbon supports are well known in the prior art. These include various chemical (liquid or gas phase) and electrochemical processes.

The metal oxide in FIG. 6 has been treated with a silylating agent such as 3-aminopropyltriethoxysilane to attach 3-aminopropylsilanol groups to the surface. Similarly, the metal oxide in FIG. 7 has been treated with a reagent such as N-(2-aminoethyl)-3-aminopropyltrimethoxysilane to attach N-(2-aminoethyl)-3-aminopropylsilanol groups. These silylating agents are commercially available.

The hydrogen atoms of the amino groups of the silylated metal oxides may be replaced with methylenephosphonic acid acetic acid groups using the chemical treatment of route I outlined above. There are two such hydrogen atoms per silanol in FIG. 6 and three in FIG. 7. Alternatively, the chemical treatment of route II is used for attaching two iminodi(methylenephosphonic acid) or two iminodi(acetic acid) groups to each 3-aminopropylsilanol group in FIG. 6. Although not shown, the treatment according to route II is also possible for the process of FIG. 7. In this case the 2,4,6-trichloro-1,3,5-triazine reagent can react at either the primary or secondary amine positions, or both of them.

The formation of Fe-ion complexes from the materials produced according to FIGS. 4 to 7 is accomplished simply by exposing them to a solution of an iron salt (either $Fe^{2+}$ or $Fe^{3+}$). It should be noted that the resulting complexes may contain additional ligands such as $H_2O$, $OH^-$, or $Cl^-$.

Two possible further ligands, which are shown in FIGS. 8 and 9, and their preparation on the cathode will be described hereinafter.

The polyaminocarboxylate ligand in FIG. 8 is prepared in two steps. First, the surface of the carbon or metal oxide is silylated with the commercially available reagent N'-[3-(trimethoxy-silyl)-propyl]-diethylenetriamine. During this step, the methoxy-silane end of the molecule condenses with OH-groups on the electrode surface. The second step is to treat the electrode with chloroacetic acid or its salt. This reagent reacts with the amine nitrogen atoms to generate the aminocarboxylate groups. Exposure of the modified electrode to a solution of an iron salt (either $Fe^{2+}$ or $Fe^{3+}$) generates the immobilized catalyst. Other amine-containing silylating agents can be used instead of this one, and bromo- or iodoacetic acid can be used instead of chloroacetic acid.

The ligand in FIG. 9 contains two bisphosphonate groups as binding sites for the iron ($Fe^{2+}$ and $Fe^{3+}$) ion. As noted above, bisphosphonate is an analogue of the pyrophosphate group, so that it has the $Fe^{2+}$-coordinating characteristics necessary for effecting the generation of .OH via reaction (4). As FIG. 9 illustrates, a central triazine unit connects the organosilane linker and the two arms containing the bisphosphonate groups. This trisubstituted molecule is synthesized by reacting one mole of (3-aminopropyl)triethoxysilane and two moles of (3-amino-propyl) hydroxymethane bisphosphonic acid with one mole of 2,4,6-trichloro-1,3,5-triazine (also known as cyanuric chloride). (3-Mercaptopropyl) trimethoxysilane can be used instead of (3-aminopropyl) trimethoxysilane. The alkoxy-silane end of the tri-substituted molecule is then reacted with OH-groups on the electrode surface to attach the molecule to the electrode. Exposure of the modified electrode to a solution of an iron salt (either $Fe^{2+}$ or $Fe^{3+}$) generates the immobilized catalyst.

Alternatively, the electrode is reacted first with a trialkoxysilane reagent to generate an electrode with free amine or thiol groups on its surface. The resultant amine or thiol groups are then reacted with 2,4,6-trichloro-1,3,5-triazine to generate an electrode with reactive dichlorotriazine groups attached. These dichlorotriazine groups are then reacted with (3-amino-propyl) hydroxymethane bisphosphonic acid to generate the structure shown in FIG. 9. This synthetic route has an advantage over the one outlined previously in that each step is a heterogeneous reaction. Thus excess amounts of the reactants can be used and subsequently removed by simple washing.

It should be noted that the ligands of the Fe-complex need not necessarily be organic and the use of inorganic ligands is also contemplated.

Several electrochemical cells as previously described may be combined in an apparatus in order to purify larger amounts of fluids, e.g. waste water. FIG. 10 shows a possible configuration of an arrangement of electrochemical cells. According to FIG. 10, the electrochemical cells, referenced as 10, have a generally square shape and are arranged in a regular pattern. The outer wall 12 of each cell is formed by the anode and within the cell there is a conduit 14 for guiding the fluid to be purified therethrough. The walls 16 of this conduit 14 form the cathode of the cell and have the Fe-complex attached to their inner side facing the conduit 14. The space between the anode 12 and the cathode 16 is filled with an electrolyte 18 of the kind previously described. It should be noted that each inner anode wall, e.g. the walls designated by 12a and 12b, are common to two electrochemical cells which not only reduces the amount of material necessary for building the apparatus, but also connects all anodes and puts them onto the same potential. In operation the fluid to be purified is conducted through the channels 14, where OH radicals are created in the manner described above for oxidizing the pollutants.

Oxygen supply and, if necessary, water supply, may be fed to the electrolyte 18 by suitable conduits (not shown) or may be otherwise provided in any appropriate and suitable manner.

It should be noted that the arrangement according to FIG. 10 is just one example for possible configurations of electrochemical cells in a fluid purifying apparatus according to the present invention and the invention is not limited to this arrangement.

The present invention is especially suitable for compact and lightweight units, which can be powered from an electric grid, a car battery, a wind turbine or solar cells, for example.

The features of the present invention disclosed in the specification, the claims and/or the drawings, may both separately and in any combination thereof, be material for realizing the invention in various forms thereof.

What is claimed is:

1. An apparatus for purifying fluids comprising at least one electrochemical cell having a cathode, an anode and an electrolyte between said cathode and anode, said anode creating positive ions and electrons, said electrolyte allowing for the transfer of positive charges, said cell further comprising a catalyst for promoting a reaction creating the hydroxyl radical, said catalyst being immobilized in or at a solid located at the cathode side of the cell, said solid being arranged such that the fluid to be purified can come into contact with the catalyst, wherein said catalyst is a metal complex, ML, wherein M represents a metal and L represents an organic or inorganic ligand, said complex being capable of forming the hydroxyl radical by a reaction wherein the metal in the complex is oxidized and acquires an additional positive charge.

2. The apparatus according to claim 1, wherein said metal complex is a Fe complex, FeL.

3. The apparatus according to claim 2, wherein said Fe complex, FeL, is capable of undergoing the reaction:

$$3Fe^{2+}L+O_2+3H^+\rightarrow 3Fe^{3+}L+.OH+H_2O$$

wherein said anode allows for a reaction creating $H^+$ ions and electrons, and wherein said electrolyte allows for the transfer of $H^+$ ions.

4. The apparatus according to claim 1, wherein said catalyst is attached to or incorporated into the cathode and/or said metal complex is attached to or incorporated into a solid electrolyte at the cathode side of said electrolyte.

5. The apparatus according to claim 1, wherein said anode comprises a catalyst for promoting the reaction:

$$H_2O\rightarrow\tfrac{1}{2}O_2+2H^++2e^-.$$

6. The apparatus according to claim 1, wherein the ligand L is selected from the group consisting of polyphosphates, pyrophosphates, bisphosphonates, polyaminocarboxylates, citrates, ethylene amines and derivatives thereof and further comprising analogues of said substances and derivatives which allow covalent attachment to the cathode.

7. The apparatus according to claim 6, wherein said ligand is selected from the group consisting of acetic derivatives of ethylene amine, polyphosphates or bisphosphonates and analogues thereof.

8. The apparatus according to claim 1, wherein said ligand is represented by the formula:

$$R\text{---}(NX_2)_p,$$

wherein X is ($-CH_2PO_3H_2$) or ($-CH_2CO_2H$), wherein $1\leq p\leq 2$, and wherein R is an organic moiety.

9. The apparatus according to claim 1, wherein the ligand exhibits a covalent bond to the cathode material obtainable by silylation.

10. The apparatus according to claim 1, wherein said anode and/or cathode is a carbon or metal oxide electrode.

11. The apparatus according to claim 1, wherein said anode and/or cathode is porous.

12. The apparatus according to claim 1, wherein said apparatus further comprises means for conducting the fluid to be purified to a side of the cell where it may come into contact with the metal complex, said anode being isolated from the fluid to be purified.

13. The apparatus according to claim 1, wherein said electrolyte is a polymeric electrolyte membrane, wherein the anode and the cathode are attached to said membrane.

14. The apparatus according to claim 1, wherein the electrolyte is sandwiched between a cathode and an anode, said cathode having a side contacting the fluid to be purified and an electrolyte contacting side, and that the electrolyte prohibits the migration of the fluid to be purified and/or of pollutants therein to the anode.

15. The apparatus according to claim 1, wherein said electrolyte allows for the transfer of $O_2$ and $H_2O$.

16. The apparatus according to claim 1, wherein the apparatus further comprises a plurality of electrochemical cells and means for bringing the fluid to be purified in contact with the metal complex in each cell.

17. The apparatus according to claim 16, wherein said plurality of cells is arranged in a series, parallel and/or cyclic configuration with respect to the flow of the fluid to be purified.

18. The apparatus according to claim 16, wherein at least part of the outer walls of a cell form an electrode of said electrochemical cell and at least part of the cells share a common wall with another cell, said common wall forming an electrode for at least two cells.

19. The apparatus according to claim 16, wherein the apparatus further comprises a conduit having walls, said conduit adapted to conduct the fluid to be purified, wherein at least part of the walls of said conduit is formed by the cathode of one or more electrochemical cells.

20. An electrochemical cell for use in an apparatus or method for purifying fluids, comprising a cathode, an anode and an electrolyte between said cathode and anode, wherein a catalyst for promoting a reaction creating the hydroxyl radical is immobilized at or in a solid located at the cathode side of the cell, said anode allowing for a reaction creating positive ions and electrons, said electrolyte allowing the transfer of positive charges, wherein a metal complex, ML, is immobilized at or in a solid at the cathode side of the cell, where L represents an organic or inorganic ligand and M represents a metal, said complex being capable of forming the hydroxyl radical by a reaction wherein the metal in the complex is oxidised and acquires an additional positive charge.

21. The method according to claim 20, wherein said fluid is wastewater.

22. An electrode for use in an electrochemical apparatus for purifying fluids, wherein said electrode comprises a catalyst for promoting a reaction creating the hydroxyl radical, wherein said electrode further comprises a metal complex, ML, where M represents a metal and L represents an organic or inorganic ligand, said complex being capable of forming the hydroxyl radical by a reaction wherein the metal in the complex is oxidised and acquires an additional positive charge.

23. A method of purifying fluids, comprising the steps of providing a cathode and an anode, said anode and cathode being separated by an electrolyte allowing the transfer of positive charges, and providing a catalyst for promoting a reaction creating the hydroxyl radical immobilized at or in a solid located at the cathode side of the electrolyte, connecting said cathode and anode to an electric power source, conducting fluid to be purified to the catalyst, wherein said method further comprises the steps of providing a metal complex, ML, immobilized at or in a solid located at the cathode side of the electrolyte, where M represents a metal and L represents an organic or inorganic ligand, said complex being capable of forming the hydroxyl radical by a reaction wherein the metal in the complex is oxidised and acquires an additional positive charge, said anode creating positive ions and electrons, and conducting fluid to be purified to the metal complex.

24. The method according to claim 23, wherein said metal complex is an Fe complex, FeL, capable of undergoing the reaction:

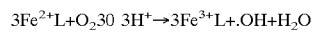

$$3Fe^{2+}L + O_2 30\ 3H^+ \rightarrow 3Fe^{3+}L + .OH + H_2O$$

said anode enabling a reaction creating $H^+$ ions and electrons, said electrolyte allowing the transfer of $H^+$-ions.

25. The method according to claim 23, wherein $O_2$ is conducted either separately or together with said fluid to be purified to the cathode to come into contact with the Fe-complex.

26. The method according to claim 25, wherein $O_2$ is added to the fluid to be purified.

27. The method according to claim 23, wherein said electrolyte allows the transfer of $O_2$, and wherein $O_2$ is fed to said electrolyte.

28. The method according to claim 23, wherein $H_2O$ is supplied to the anode to come into contact with the reaction site at the anode side of the electrolyte.

29. The method according to claim 28, wherein said electrolyte allows the transfer of $H_2O$, and wherein $H_2O$ is fed to said electrolyte.

30. The method according to claim 23, wherein said fluid is wastewater.

* * * * *